United States Patent
Okamoto

(10) Patent No.: US 9,030,546 B2
(45) Date of Patent: May 12, 2015

(54) IMAGE PROCESSOR, IMAGE PROCESSING METHOD, PROGRAM AND MICROSCOPE

(75) Inventor: Takaaki Okamoto, Fujisawa (JP)

(73) Assignee: Nikon Corporation, Tokyo (JP)

( * ) Notice: Subject to any disclaimer, the term of this patent is extended or adjusted under 35 U.S.C. 154(b) by 248 days.

(21) Appl. No.: 13/310,178

(22) Filed: Dec. 2, 2011

(65) Prior Publication Data

US 2012/0147172 A1 Jun. 14, 2012

Related U.S. Application Data

(63) Continuation of application No. PCT/JP2010/059318, filed on Jun. 2, 2010.

(30) Foreign Application Priority Data

Jun. 2, 2009 (JP) .............................. P2009-132734

(51) Int. Cl.
| | |
|---|---|
| H04N 7/18 | (2006.01) |
| G02B 21/36 | (2006.01) |
| G02B 21/00 | (2006.01) |
| G06T 7/00 | (2006.01) |
| G06T 5/50 | (2006.01) |
| G02B 15/04 | (2006.01) |

(52) U.S. Cl.
CPC .............. *G02B 21/367* (2013.01); *G02B 15/04* (2013.01); *G02B 21/0088* (2013.01); *G06T 7/0028* (2013.01); *G06T 2207/10056* (2013.01); *G06T 2207/10064* (2013.01); *G06T 2207/30024* (2013.01); *G06T 5/50* (2013.01)

(58) Field of Classification Search
CPC .. G02B 15/04; G02B 21/0088; G02B 21/367; G02B 2207/10056; G02B 2207/10064; G02B 2207/30024; G02B 7/0028
USPC ....................... 348/79; 382/287, 294; 359/388
See application file for complete search history.

(56) References Cited

U.S. PATENT DOCUMENTS 5,074,667 A * 12/1991 Miyatake ...................... 356/401
6,489,625 B1 * 12/2002 Takahashi ................. 250/559.29
(Continued)

FOREIGN PATENT DOCUMENTS

| JP | 1992-62858 | 2/1992 |
|---|---|---|
| JP | 1994-258240 | 9/1994 |

(Continued)

OTHER PUBLICATIONS

Japanese Office Action mailed Jan. 31, 2013 in corresponding Japanese Patent Application No. 2011-518464.

(Continued)

*Primary Examiner* — Christopher S Kelley
*Assistant Examiner* — Asmamaw G Tarko
(74) *Attorney, Agent, or Firm* — Staas & Halsey LLP

(57) ABSTRACT

An image processor, a program and a microscope enable a TIRF image and a confocal image to be superposed simply and accurately. A reference point detection unit 111 detects, reference points, three or more images respectively from a TIRF image of a predetermined surface of a sample obtained using a total internal reflection fluorescence microscope, and a confocal image of the predetermined surface of the sample obtained using a confocal microscope. A superposing unit superposes the TIRF image and the confocal image using a coordinate transformation coefficient.

15 Claims, 14 Drawing Sheets

(56) References Cited

U.S. PATENT DOCUMENTS

| | | | |
|---|---|---|---|
| 6,654,097 B1* | 11/2003 | Nishi | 355/53 |
| 7,079,316 B2 | 7/2006 | Weiss et al. | |
| 7,551,351 B2* | 6/2009 | Ulrich et al. | 359/388 |
| 7,573,635 B2* | 8/2009 | Uhl | 359/388 |
| 7,706,060 B2* | 4/2010 | Mogami et al. | 359/388 |
| 7,981,604 B2* | 7/2011 | Quake | 435/6.12 |
| 8,014,065 B2* | 9/2011 | Nihoshi | 359/388 |
| 8,559,103 B2* | 10/2013 | Hecker | 359/388 |
| 8,861,834 B2 | 10/2014 | Fujieda | |
| 2005/0037406 A1* | 2/2005 | De La Torre-Bueno et al. | 435/6 |
| 2005/0082494 A1* | 4/2005 | Motomura | 250/458.1 |
| 2005/0206893 A1* | 9/2005 | Montagu | 356/317 |
| 2005/0270639 A1 | 12/2005 | Miki | |
| 2007/0286526 A1* | 12/2007 | Abousleman et al. | 382/284 |
| 2008/0285123 A1* | 11/2008 | Funk et al. | 359/388 |
| 2008/0297890 A1 | 12/2008 | Natori et al. | |
| 2009/0225936 A1* | 9/2009 | Kashiwagi et al. | 378/37 |
| 2010/0053736 A1* | 3/2010 | Okugawa | 359/363 |
| 2011/0275523 A1* | 11/2011 | Quake | 506/2 |
| 2011/0284767 A1* | 11/2011 | Wolleschensky et al. | 250/459.1 |
| 2013/0016891 A1* | 1/2013 | Ingermanson et al. | 382/133 |
| 2013/0135717 A1* | 5/2013 | Schulz | 359/388 |

FOREIGN PATENT DOCUMENTS

| | | | | |
|---|---|---|---|---|
| JP | 2000-284186 | | 10/2000 | |
| JP | 2003-164433 | | 6/2003 | |
| JP | 2004-085811 | * | 3/2004 | ............ G02B 21/06 |
| JP | 2004-85811 | | 3/2004 | |
| JP | 2004-334222 | | 11/2004 | |
| JP | 2005/331887 | | 12/2005 | |
| JP | 2006-39048 | | 2/2006 | |
| JP | 2006-106346 | | 4/2006 | |
| JP | 2007-93488 | | 4/2007 | |
| JP | 2007-328134 | | 12/2007 | |
| JP | 2009-8739 | | 1/2009 | |
| WO | WO 2008/111452 A1 | | 9/2008 | |

OTHER PUBLICATIONS

International Search Report in corresponding International Application No. PCT/JP2010/059318.

Extended European Search Report dated Oct. 15, 2014 in European Application No. 10783391.5.

* cited by examiner

IMAGE PROCESSOR, IMAGE PROCESSING
METHOD, PROGRAM AND MICROSCOPE

CROSS-REFERENCE TO RELATED APPLICATIONS

This is a continuing application, filed under 35 U.S.C. §111(a), of International Application PCT/PCT/JP2010/059318, filed Jun. 2, 2010, which claims priority benefit of Japanese Application No. 2009-132734, filed Jun. 2, 2008, of which the entire contents are incorporated herein.

TECHNICAL FIELD

The present invention relates to an image processor, an image processing method, a program and a microscope, and more particularly to an image processor, an image processing method, a program and a microscope suitable for superposing an image obtained by a total internal reflection fluorescence microscope and an image obtained by a confocal microscope.

BACKGROUND

A microscope, which can be used for both a total internal reflection fluorescence microscope (TIRF microscope) and a confocal microscope by switching an optical member has been proposed (e.g. Patent document 1).
Patent document 1: Japanese Patent Application Laid-Open No. 2004-85811

In the case of checking the phenomena of a sample using both an image obtained by a total internal reflection fluorescence microscope (hereafter called a TIRF image) and an image obtained by a confocal microscope (hereafter called a confocal image), the two images may be superposed to determine whether the objects which appear in [the TIRF image and the confocal image] are the same, for example. However a method for obtaining an image of a sample (a method for illuminating the sample) is different between the total internal reflection fluorescence microscope and the confocal microscope, hence an observation range (in the depth direction of the sample), image size or the like are different between a TIRF image and a confocal image. This means that, in order to superpose these two images, such corrections as enlargement, reduction, rotation, parallel shift and inversion must be performed for the images.

In the case of a conventional microscope however, a user must correct images and superpose a TIRF image and a confocal image while visually checking.

DISCLOSURE OF THE INVENTION

With the foregoing in view, it is an object of the present invention to provide means to simply and accurately superpose images obtained by microscopes based on different observation methods, such as a TIRF image and a confocal image.

An image processor according to a first aspect of the present invention comprises: a reference point detection unit that detects respectively, as reference points, three or more bright spots included in a pair formed by a combination of first bright spots, which are a plurality of bright spots selected from a plurality of bright spots in a first image of a predetermined surface of a sample obtained using a first microscope, and a combination of second bright spots, which are a plurality of bright spots selected from a plurality of bright spots in a second image of the predetermined surface of the sample obtained using a second microscope, the pair being such that each of the bright spots in one of the combinations and each of the bright spots in the other combination positionally correspond to an identical position on the predetermined surface of the sample; and a calculation unit that calculates transformation coefficients for mutually transforming a first coordinate system of the reference points in the first image and a second coordinate system of the reference points in the second image.

An image processing method according to the first aspect of the present invention comprises: detecting respectively, as reference points, three or more bright spots included in a pair formed by a combination of first bright spots, which are a plurality of bright spots selected from a plurality of bright spots in a first image of a predetermined surface of a sample obtained using a first microscope, and a combination of second bright spots, which are a plurality of bright spots selected from a plurality of bright spots in a second image of the predetermined surface of the sample obtained using a second microscope, the pair being such that each of the bright spots in one of the combinations and each of the bright spots in the other combination positionally correspond to an identical position on the predetermined surface of the sample; and calculating transformation coefficients for mutually transforming a first coordinate system of the reference points in the first image and a second coordinate system of the reference points in the second image.

A program according to the first aspect of the present invention is for causing a computer to execute processing comprising: detecting respectively, as reference points, three or more bright spots included in a pair formed by a combination of first bright spots, which are a plurality of bright spots selected from a plurality of bright spots in a first image of a predetermined surface of a sample obtained using a first microscope, and a combination of second bright spots, which are a plurality of bright spots selected from a plurality of bright spots in a second image of the predetermined surface of the sample obtained using a second microscope, the pair being such that each of the bright spots in one of the combinations and each of the bright spots in the other combination positionally correspond to an identical position on the predetermined surface of the sample; and calculating transformation coefficients for mutually transforming a first coordinate system of the reference points in the first image and a second coordinate system of the reference points in the second image.

According to the first aspect of the present invention, there are respectively detected, as reference points, three or more bright spots included in a pair formed by a combination of first bright spots, which are a plurality of bright spots selected from a plurality of bright spots in a first image of a predetermined surface of a sample obtained using a first microscope, and a combination of second bright spots, which are a plurality of bright spots selected from a plurality of bright spots in a second image of the predetermined surface of the sample obtained using a second microscope, the pair being such that each of the bright spots in one of the combinations and each of the bright spots in the other combination positionally correspond to an identical position on the predetermined surface of the sample; and transformation coefficients for mutually transforming a first coordinate system of the reference points in the first image and a second coordinate system of the reference points in the second image are calculated.

A microscope according to a second aspect of the present invention is a microscope which can be used as a first microscope and as a second microscope, comprising: a reference point detection unit that detects respectively, as reference points, three or more bright spots included in a pair formed by a combination of first bright spots, which are a plurality of bright spots selected from a plurality of bright spots in a first image of a predetermined surface of a sample obtained using the microscope as the first microscope, and a combination of second bright spots, which are a plurality of bright spots selected from a plurality of bright spots in a second image of the predetermined surface of the sample obtained using the microscope as the second microscope, the pair being such that each of the bright spots in one of the combinations and each of the bright spots in the other combination positionally correspond to an identical position on the predetermined surface of the sample; and a calculation unit that calculates transformation coefficients for mutually transforming a first coordinate system of the reference points in the first image and a second coordinate system of the reference points in the second image.

According to the second aspect of the present invention, there are respectively detected, as reference points, three or more bright spots included in a pair formed by a combination of first bright spots, which are a plurality of bright spots selected from a plurality of bright spots in a first image of a predetermined surface of a sample obtained using the microscope as the first microscope, and a combination of second bright spots, which are a plurality of bright spots selected from a plurality of bright spots in a second image of the predetermined surface of the sample obtained using the microscope as the second microscope, the pair being such that each of the bright spots in one of the combinations and each of the bright spots in the other combination positionally correspond to an identical position on the predetermined surface of the sample; and transformation coefficients for mutually transforming a first coordinate system of the reference points in the first image and a second coordinate system of the reference points in the second image are calculated.

An image processor according to a third aspect of the present invention comprises: a reference point detection unit that, out of pairs formed by a combination of three first bright spots selected from a plurality of bright spots in a first image of a predetermined surface of a sample obtained using a total internal reflection fluorescence microscope, and a combination of three second bright spots selected from a plurality of bright spots in a second image of the predetermined surface of the sample obtained using a confocal microscope, detects, as reference points, respectively bright spots included in a pair where a triangle having the three bright spots included in one of the combinations as vertexes is approximately similar to a triangle having the three bright spots included in the other combination as vertexes, the reference points being such that each of the reference points in one of the combinations and each of the reference points in the other combination positionally correspond to an identical position on the predetermined surface of the sample; a calculation unit that calculates transformation coefficients for mutually transforming a first coordinate system of the reference points in the first image and a second coordinate system of the reference points in the second image; and a superposing unit that superposes the first image and the second image using the transformation coefficients, or that superposes, using the transformation coefficients, the first image and an image, obtained using the confocal microscope, of a surface of the sample, which is different from the predetermined surface.

An image processing method according to a third aspect of the present invention comprises the steps of: out of pairs formed by a combination of three first bright spots selected from a plurality of bright spots in a first image of a predetermined surface of a sample obtained using a total internal reflection fluorescence microscope, and a combination of three second bright spots selected from a plurality of bright spots in a second image of the predetermined surface of the sample obtained using a confocal microscope, detecting, as reference points, respectively bright spots included in a pair where a triangle having the three bright spots included in one of the combinations as vertexes is approximately similar to a triangle having the three bright spots included in the other combination as vertexes, the reference points being such that each of the reference points in one of the combinations and each of the reference points in the other combination positionally correspond to an identical position on the predetermined surface of the sample; calculating transformation coefficients for mutually transforming a first coordinate system of the reference points in the first image and a second coordinate system of the reference points in the second image; and superposing the first image and the second image using the transformation coefficients, or superposing, using the transformation coefficients, the first image and an image, obtained using the confocal microscope, of a surface on the sample, which is different from the predetermined surface.

According to the image processing method of the third aspect of the present invention, out of pairs formed by a combination of three first bright spots selected from a plurality of bright spots in a first image of a predetermined surface of a sample obtained using a total internal reflection fluorescence microscope, and a combination of three second bright spots selected from a plurality of bright spots in a second image of the predetermined surface of the sample obtained using a confocal microscope, there are respectively detected, as reference points, bright spots included in a pair where a triangle having the three bright spots included in one of the combinations as vertexes is approximately similar to a triangle having the three bright spots included in the other combination as vertexes, the reference points being such that each of the reference points in one of the combinations and each of the reference points in the other combination positionally correspond to an identical position on the predetermined surface of the sample; transformation coefficients for mutually transforming a first coordinate system of the reference points in the first image and a second coordinate system of the reference points in the second image are calculated; and the first image and the second image are superposed using the transformation coefficients, or the first image and an image, obtained using the confocal microscope, of a surface of the sample, which is different from the predetermined surface, are superposed using the transformation coefficients.

According to the first to third aspects, a coordinate system of an image obtained by a total internal reflection fluorescence microscope and a coordinate system of an image obtained by a confocal microscope can be mutually transformed. As a result, the image obtained by the total internal reflection fluorescence microscope and the image obtained by the confocal microscope can be superposed simply and accurately.

BEST MODE FOR CARRYING OUT THE INVENTION

Embodiments of the present invention will now be described with reference to the drawings.

Figure 1:
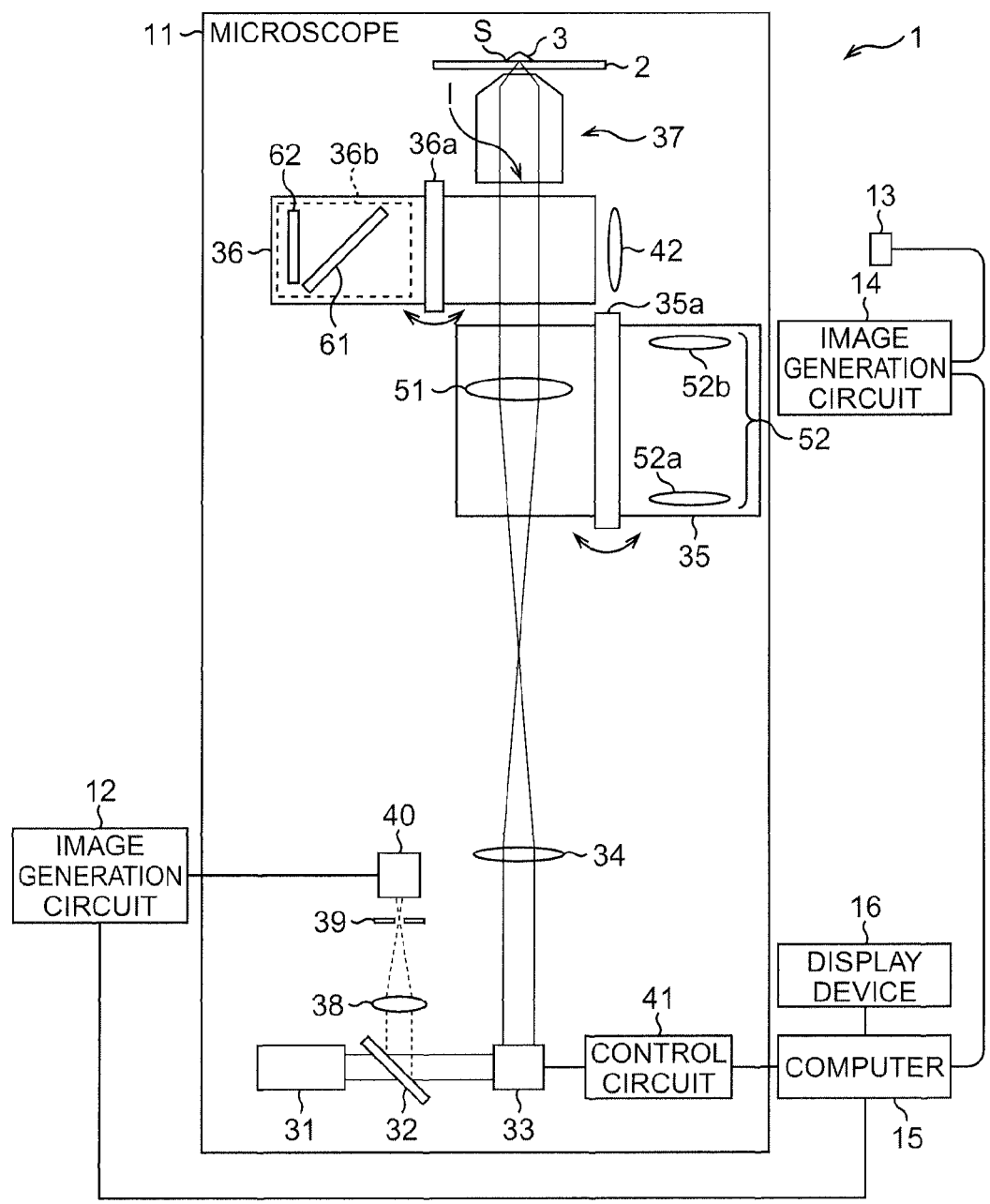
FIG. 1 is a diagram depicting a configuration when a microscope system to which the present invention is applied is used as a confocal microscope.
Figure 2:
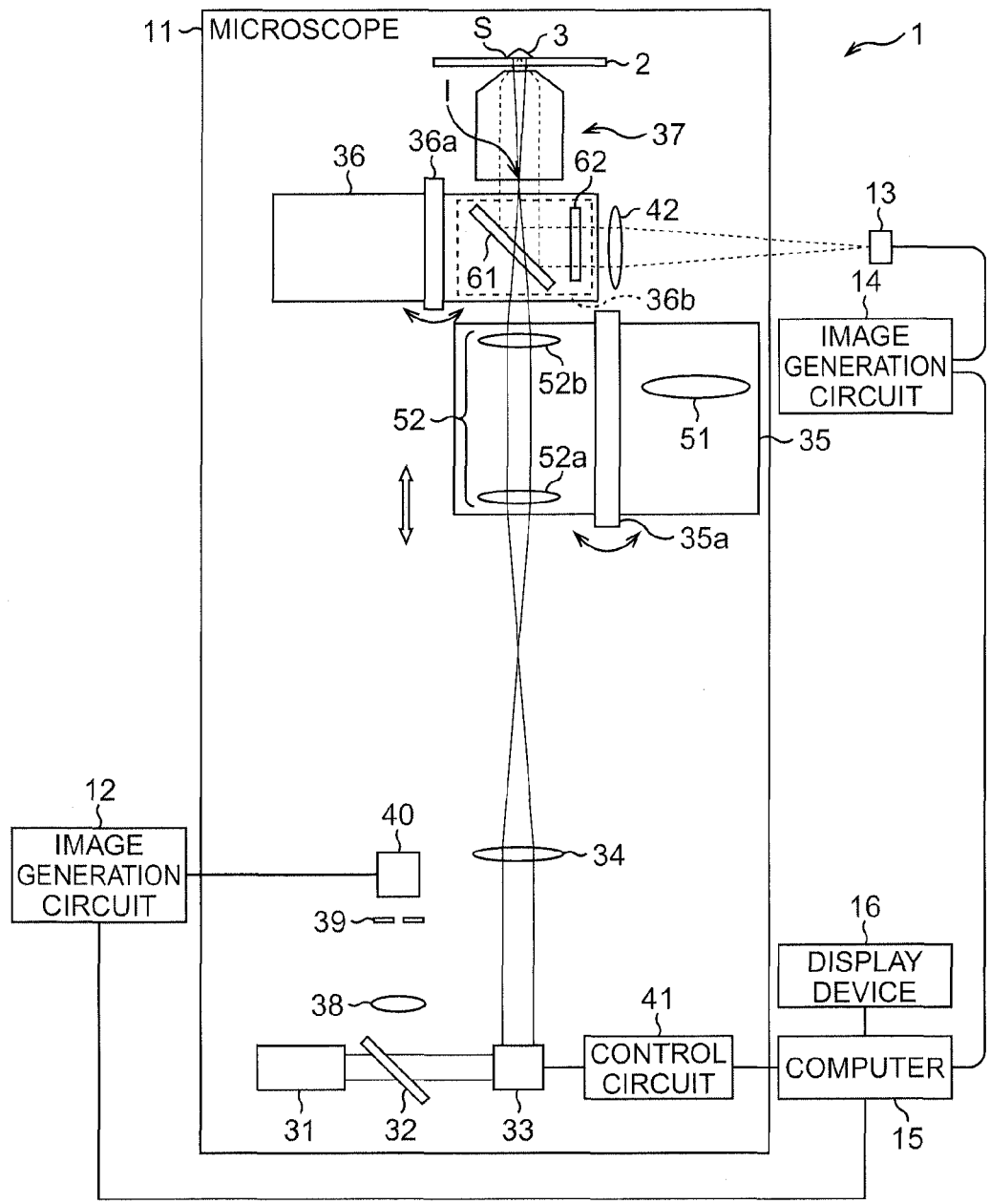
FIG. 2 is a diagram depicting a configuration when a microscope system to which the present invention is applied is used as a total internal reflection fluorescence microscope.

FIG. 1 and FIG. 2 illustrate an embodiment of a microscope system to which the present invention is applied. The microscope system 1 comprises a microscope 11, an image generation circuit 12, an imaging device 13, an image generation circuit 14, a computer 15 and a display device 16.

The microscope 11 can be used as a confocal microscope or a total internal reflection fluorescence microscope by changing locations where a lens support member 35 and an optical element support member 36 are disposed.

In concrete terms, the lens support member 35 is constituted by a rotary turret, for example, and is disposed to be rotatable around a rotation axis 35a. The lens support member 35 has a second relay lens system 51 and a third relay lens system 52.

The optical element support member 36, on the other hand, is constituted by a rotary turret, for example, and is disposed to be rotatable around a rotation axis 36a. The optical element support member 36 has a path splitting optical element 36b, where a beam splitter 61 and an illumination light cut-off filter 62 are integrated.

If it is set such that the second relay lens system 51 of the lens support member 35 is inserted onto the optical axis of the microscope 11 and the path splitting optical element 36b of the optical element support member 36 is not inserted onto the optical axis of the microscope 11, as shown in FIG. 1, the microscope 11 can be used as a confocal microscope. On the other hand, if it is set such that a third relay lens system 52 of the lens support member 35 and the path splitting optical element 36b of the optical element support member 36 are inserted onto the optical path of the microscope 11, as shown in FIG. 2, the microscope 11 can be used as a total internal reflection fluorescence microscope.

A case of using the microscope 11 as a confocal microscope will be described first with reference to FIG. 1.

An illumination light emitted from a laser illumination light source 31 (hereafter called confocal light) transmits through a beam splitter 32, and enters a two-dimensional scanner 33. The confocal light emitted from the two-dimensional scanner 33 enters an objective lens 37 via a first relay lens system 34 and the second relay lens system 51, and is collected on a sample 3 placed on a cover glass 2.

In this case, a control circuit 41 scans the confocal light on a two-dimensional plane of the sample 3 while controlling the scanning range and the scanning speed by controlling two scanners, which are disposed on the two-dimensional scanner 33 and of which optical deflection directions are perpendicular to each other, based on the control signals supplied from the computer 15.

The light (fluorescence) from the sample 3 is collected by the object lens 37 and is reflected toward an imaging lens 38 by the beam splitter 32 via a same optical path as the confocal light, and forms an image on a photomultiplier 40 via the imaging lens 38 and a pin hole 39. The photomultiplier 40 detects the intensity of light which formed the image, and supplies a photodetection signal to indicate the intensity of the detected light to the image generation circuit 12.

Based on the control signals supplied from the computer 15, the image generation circuit 12 performs image processing to arrange the photodetection signal from the photomultiplier 40 in each pixel according to the scanning speed by the two-dimensional scanner 33 and generates a confocal image, which is an observation image by the confocal microscope. The image generation circuit 12 supplies the generated confocal image to the computer 15, and the display device 16 displays the confocal image based on control by the computer 15.

A case of using the microscope 11 as a total internal reflection fluorescence microscope will be described with reference to FIG. 2.

An illumination light emitted from the laser illumination light source 31 (hereafter called TIRF light) transmits through the beam splitter 32 and enters the two-dimensional scanner 33. The TIRF light emitted from the two-dimensional scanner 33 enters the first relay lens system 34, and is collected near an entrance pupil plane (image side focal plane) I of the object lens 37 via a relay lens system 52a and a relay lens system 52b constituting the third relay lens system 52. Then the TIRF light transmits through the objective lens 37 so as to become approximately a parallel beam, and is irradiated onto the sample 3.

In this case, the control circuit 41 adjusts the position of the TIRF light entering the entrance pupil plane I of the objective lens 37 by controlling the scanning operation of the two-dimensional scanner 33 based on the control signal supplied by the computer 15. As the entering position of the TIRF light is shifted further away from the center of the entrance pupil plane I, the incident angle of the TIRF light to the sample 3 increases, and if the incident angle exceeds a predetermined angle, the TIRF light is totally reflected onto the boundary surface S between the sample 3 and the cover glass 2. In this total reflection state, an evanescent light is generated near the boundary surface S, and only a very thin range near the boundary surface S of the sample 3 is irradiated by the evanescent light.

The light (fluorescence) from the sample 3 excited by the evanescent light is collected by the objective lens 37, reflected by the beam splitter 61 toward the illumination light cut-off filter 62, and an image is formed on the image device (e.g. CCD camera) 13 via the illumination light cut-off filter 62 and the imaging lens 42. Then the TIRF image, which is an observation image by the total internal reflection fluorescence microscope, is captured by the imaging device 13. The TIRF image captured by the imaging device 13 is processed by the image generation circuit 14, and supplied to the computer 15, and the display device 16 displays the TIRF image based on control by the computer 15.

As mentioned later, the computer 15 has a function to automatically superpose a TIRF image obtained when the microscope 11 is used as the total internal reflection fluorescence microscope and a confocal image obtained when the microscope 11 is used as the confocal microscope.

Figure 3:
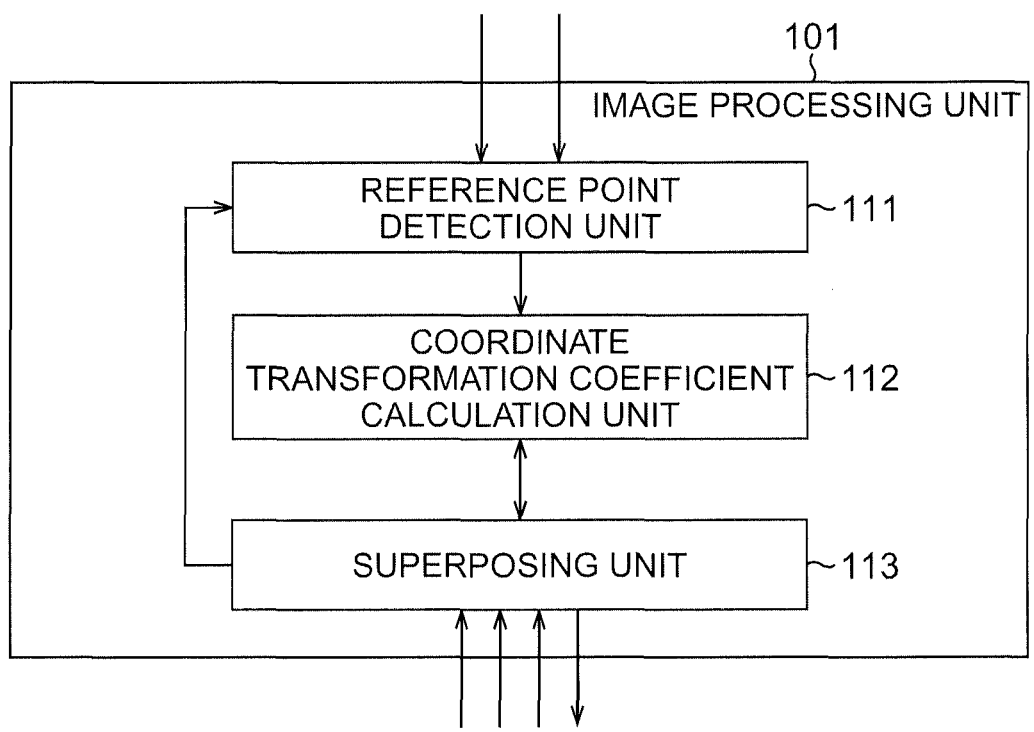
FIG. 3 is a block diagram depicting a configuration example of an image processing unit implemented by a computer of the microscope system.

FIG. 3 shows a configuration example of the image processing unit 101 which is one of the functions implemented by the computer 15 executing a predetermined control program. The image processing unit 101 has a function to automatically superpose a TIRF image and a confocal image.

In concrete terms, a reference point detection unit 111 detects three or more reference points corresponding to a same position of the sample 3 in the TIRF image supplied by the image generation circuit 14 and the confocal image supplied by the image generation circuit 12. The reference point detection unit 111 notifies coordinates of the detected reference points in the coordinate system of each image to a coordination transformation coefficient calculation unit 112.

The coordinate transformation coefficient calculation unit 112 calculates coordinate transformation coefficients for mutually transforming the coordinate system of the TIRF image and the coordinate system of the confocal image based on the reference points detected by the reference point detection unit 111. The coordinate transformation coefficient calculation unit 112 notifies the calculated coordinate transformation coefficients to a superposing unit 113.

According to the instructions input by the user through the operation unit (not illustrated) of the computer 15, the superposing unit 113 superposes the TIRF image supplied by the image generation circuit 14 and the confocal image supplied by the image generation circuit 12 using the coordinate transformation coefficient calculated by the coordinate transformation coefficient calculation unit 112. Then the superposing unit 113 outputs the superposed image to the subsequent stage (e.g. display control device of the computer 15). If necessary, the superposing unit 113 instructs the reference point detection unit 111 and the coordinate transformation coefficient calculation unit 112 to calculate the coordinate transformation coefficients, and supplies the TIRF image and the confocal image to the reference point detection unit 111.

The coordinate transformation coefficient calculation processing executed by the microscope system 1 will now be described with reference to the flow chart in FIG. 4.

Figure 5:
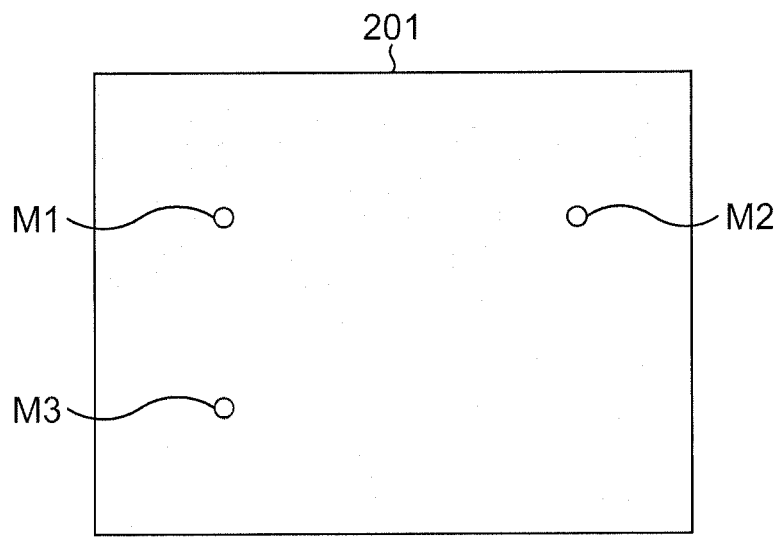
FIG. 5 shows an example of a sample.

In step S1, the microscope system 1 obtains a TIRF image of a test sample 201. In concrete terms, the user places the test sample 201 shown in FIG. 5, instead of the sample 3, on a cover glass 2 on the stage of the microscope 11, and sets the microscope 11 to a state to use the microscope 11 as the total internal reflection fluorescence microscope (state in FIG. 2).

In the test sample 201, three points, point M1 to point M3 (hereafter called markers M1 to M3) are dyed by a reagent which emits fluorescence when a light having a predetermined wavelength is irradiated. The locations of the markers M1 to M3 are set so that the length of each side of the triangle formed by connecting the markers M1 to M3 and an angle of each vertex thereof are different from one another, in order to clearly distinguish the locations of the markers M1 to M3.

The microscope system 1 captures an image of the test sample 201 by the imaging device 13 in a state where the TIRF light, having a wavelength that excites the markers M1 to M3, is totally reflected onto the boundary surface S between the cover glass 2 and the test sample 201. The imaging device 13 supplies the TIRF image of the test sample 201, obtained as a result of the imaging, to the reference point detection unit 111 via the image generation circuit 14.

In step S2, the microscope system 1 obtains a confocal image of the test sample 201. In concrete terms, the user sets the microscope 11 to a state to use the microscope 11 as the confocal microscope (state in FIG. 1), while keeping the test sample 201 on the cover glass 2 on the stage of the microscope 11. Then while scanning the confocal light, having a wavelength to excite the markers M1 to M3, onto the boundary surface S of the cover glass 2 and the test sample 201 (scanning the same surface as the case of the TIRF light), the microscope system 1 detects the intensity of the light from the test sample 201 using the photomultiplier 40. The photomultiplier 40 supplies the photodetection signal to indicate the intensity of the detected light to the image generation circuit 12, and the image generation circuit 12 generates a confocal image of the test sample 201 based on the photodetection signal. The image generation circuit 12 supplies the generated confocal image to the reference point detection unit 111.

In step S3, the reference point detection unit 111 detects the coordinates of the markers M1 to M3 in the TIRF image. In concrete terms, the reference point detection unit 111 detects bright spot areas generated by fluorescence emitted from the markers M1 to M3 in the TIRF image, and determines the coordinates of the center of gravity of each of the detected bright spot areas in the coordinate system in the TIRF image. The reference point detection unit 111 also compares a triangle, of which vertexes are the center of gravity of each of the bright spot areas, in the TIRF image with a known triangle of which vertexes are the markers M1 to M3, so as to correspond the coordinates of the center of gravity of each of the bright spot areas with the markers M1 to M3 respectively. Then the reference point detection unit 111 notifies the corresponded coordinates of the markers M1 to M3 in the TIRF image to the coordinate transformation coefficient calculation unit 112.

In step S4, the reference point detection unit 111 detects the coordinates of the markers M1 to M3 in the confocal image by a processing the same as step S3, and notifies the corresponded coordinates of the markers M1 to M3 in the confocal image to the coordinate transformation coefficient calculation unit 112.

In step S5, the coordinate transformation coefficient calculation unit 112 calculates the coordinate transformation coefficients between the coordinate system of the TIRF image and the coordinate system of the confocal image.

The relationship of the TIRF image and the confocal image capturing a same surface of the test sample 201 is a relationship of quadratic transformation (enlargement, reduction, rotation, parallel shift, inversion). Of these, inversion of an image can be removed from the processing targets of the image processing unit 101, since inversion is easily recognized and corrected by a visual check, and the generation of inversion is known in advance depending on the configuration of the image capturing optical system, then the coordinate system of the TIRF image and the coordinate system of the confocal image can be mutually transformed by Helmert transformation.

A case of transforming the coordinates (X, Y) in the coordinate system A into the coordinates (x, y) in the coordinate system B using Helmert transformation is considered. In this case, the relationship of the coordinates (X, Y) and the coordinates (x, y) is expressed by the following Expressions (1) and (2).

$$x = X \cdot \cos\theta + Y \cdot \sin\theta + c \tag{1}$$

$$y = -X \cdot \sin\theta + Y \cdot \cos\theta + d \tag{2}$$

θ denotes a rotation angle of the coordinate axes in the case of matching the coordinate axes of the coordinate system A to the coordinate axes of the coordinate system B, and coefficient c and coefficient d denote the parallel shift amount of the origin in the x axis direction and the y axis direction respectively in the case of matching the coordinate axes of the coordinate system A to the coordinate axes of the coordinate system B. If a=cos θ and b=sin θ, and Expression (1) and Expression (2) are expressed using a matrix, then the following Expression (3) is obtained.

[Formula 1]

$$\begin{pmatrix} x \\ y \end{pmatrix} = \begin{pmatrix} X & Y & 1 & 0 \\ Y & -X & 0 & 1 \end{pmatrix} \begin{pmatrix} a \\ b \\ c \\ d \end{pmatrix} \tag{3}$$

Therefore if the coordinates of the markers M1 to M3 in the coordinate system of the TIRF image are $(X_1, Y_1)$ to $(X_3, Y_3)$, and the coordinates of the markers M1 to M3 in the coordinate system of the confocal image are $(x_1, y_1)$ to $(x_3, y_3)$, then the relationship between the coordinates $(X_1, Y_1)$ to $(X_3, Y_3)$ and the coordinates $(x_1, y_1)$ to $(x_3, y_3)$ is given by the following Expression (4).

[Formula 2]

$$\begin{pmatrix} x_1 & y_1 & 1 & 0 \\ x_2 & y_2 & 1 & 0 \\ x_3 & y_3 & 1 & 0 \\ y_1 & -x_1 & 0 & 1 \\ y_2 & -x_2 & 0 & 1 \\ y_3 & -x_3 & 0 & 1 \end{pmatrix} \begin{pmatrix} a \\ b \\ c \\ d \end{pmatrix} = \begin{pmatrix} X_1 \\ X_2 \\ X_3 \\ Y_1 \\ Y_2 \\ Y_3 \end{pmatrix} + \begin{pmatrix} vx_1 \\ vx_2 \\ vx_3 \\ vy_1 \\ vy_2 \\ vy_3 \end{pmatrix} \tag{4}$$

$vx_1$ to $vy_3$ indicate errors.

Coefficients a to d, which minimize errors $vx_1$ to $vy_3$, can be determined by Expression (5) to Expression (8) using the least square method.

[Formula 3]

$$a = \frac{\sum_{i=1}^{3} x_i \cdot \sum_{i=1}^{3} X_i + \sum_{i=1}^{3} y_i \cdot \sum_{i=1}^{3} Y_i - 3\sum_{i=1}^{3} (x_i X_i - y_i Y_i)}{\left(\sum_{i=1}^{3} x_i\right)^2 + \left(\sum_{i=1}^{3} y_i\right)^2 - 3\sum_{i=1}^{3} (x_i^2 - y_i^2)} \tag{5}$$

$$b = \frac{\sum_{i=1}^{3} y_i \cdot \sum_{i=1}^{3} X_i + \sum_{i=1}^{3} x_i \cdot \sum_{i=1}^{3} Y_i - 3\sum_{i=1}^{3} (y_i X_i - x_i Y_i)}{\left(\sum_{i=1}^{3} x_i\right)^2 + \left(\sum_{i=1}^{3} y_i\right)^2 - 3\sum_{i=1}^{3} (x_i^2 - y_i^2)} \tag{6}$$

$$c = \frac{\sum_{i=1}^{3} X_i - a\sum_{i=1}^{3} x_i - b\sum_{i=1}^{3} y_i}{3} \tag{7}$$

$$d = \frac{\sum_{i=1}^{3} Y_i - a\sum_{i=1}^{3} y_i - b\sum_{i=1}^{3} x_i}{3} \tag{8}$$

Using the markers M1 to M3 as reference points in this way, the coordinate transformation coefficient calculation unit 112 calculates the coordinate transformation coefficients a to d for mutually transforming the coordinate system of the TIRF image and the coordinate system of the confocal image, and supplies the coordinate transformation coefficients a to d to the superposing unit 113. Then the coordinate transformation coefficient calculation processing ends.

Four or more markers may be set for calculating the coordinate transformation coefficients.

Now the superposing processing which is executed by the microscope system 1 will be described with reference to the flow chart in FIG. 6.

Figure 7:
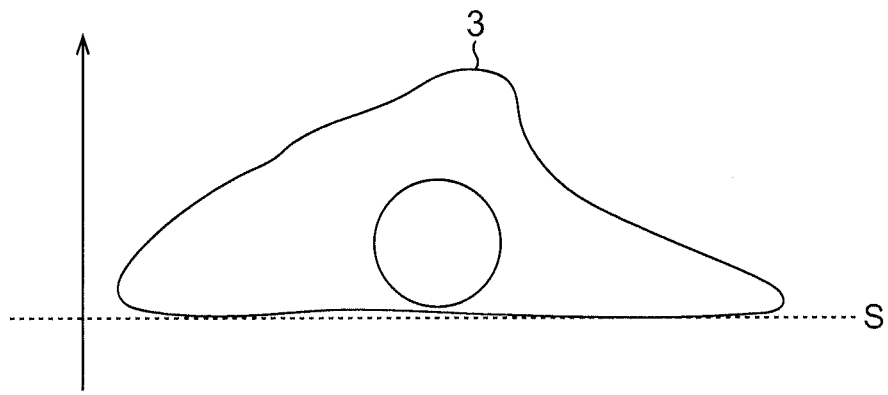
FIG. 7 is a diagram depicting a capturing position of a TIRF image.

In step S21, the microscope system 1 obtains a TIRF image of sample 3. In concrete terms, the user sets the sample 3 to be observed on the cover glass 2 on the stage of the microscope 11, and sets the microscope 11 to the state to use the microscope 11 as the total internal reflection fluorescence microscope (state in FIG. 2). The microscope system 1 captures an image of the sample 3 by the imaging device 13 in a state where the TIRF light is totally reflected onto the boundary surface S between the sample 3 shown in FIG. 7 and the cover glass 2 (not illustrated in FIG. 7). Thereby light is irradiated onto a very narrow range near the boundary surface S, and the image of the sample 3 is captured in a state of low background light. The ordinate in FIG. 7 indicates a depth direction (=optical axis direction of the microscope 11) of the sample 3. The imaging device 13 supplies the TIRF image of the sample 3 to the superposing unit 113 via the image generation circuit 14.

Figure 8:
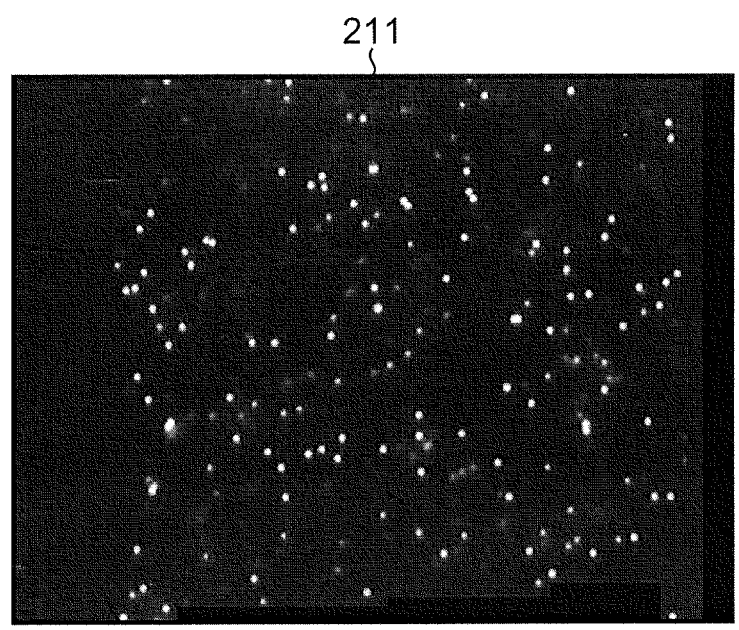
FIG. 8 shows an example of a TIRF image.

FIG. 8 shows an example of a TIRF image of the sample 3. Each of the white bright spots in the TIRF image 211 is dyed by a reagent, and includes a portion which was excited by the TIRF light and emitted fluorescence.

Figure 9:
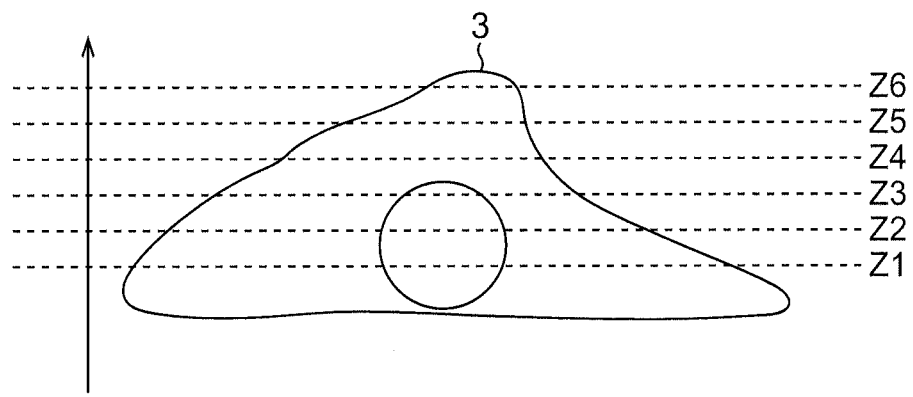
FIG. 9 is a diagram depicting a capturing position of a confocal image.

In step S22, the microscope system 1 obtains a confocal image of the sample 3. In concrete terms, the user sets the microscope 11 to a state to use the microscope 11 as the confocal microscope (state in FIG. 1) while keeping the sample 3 to be observed on the cover glass 2 on the stage of the microscope 11. Then the microscope system 1 scans the confocal light on the plane (cutting plane perpendicular to the optical axis of the microscope 11) at a position Z1 in the thickness direction of the sample 3 (=optical axis direction of the microscope 11) in FIG. 9. Then along with the scanning of the confocal light, the microscope system 1 detects the intensity of light from the sample 3 by the photomultiplier 40, and generates a confocal image of a cutting plane at the position Z1 of the sample 3 by the image generation circuit 12. In the same manner, the microscope system 1 generates a confocal image of each cutting plane at positions Z2 to Z6 of the sample 3. The image generation circuit 12 supplies the generated confocal images to the superposing unit 113.

Figure 10:
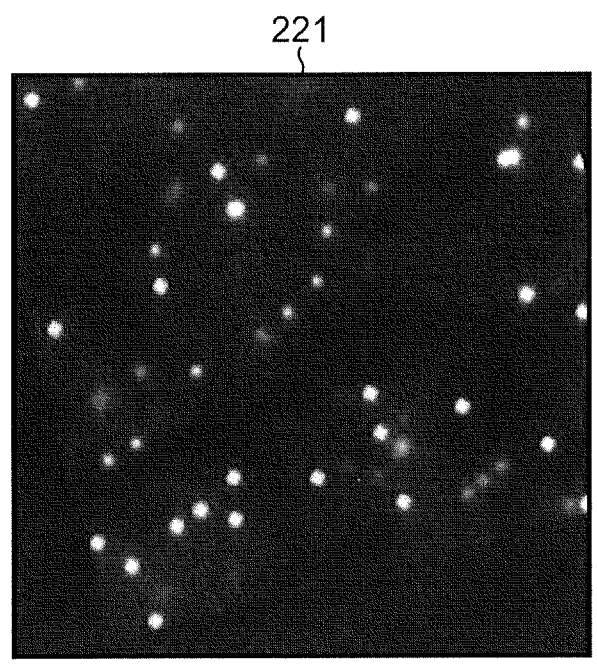
FIG. 10 shows an example of a confocal image.

FIG. 10 shows an example of a confocal image of the sample 3. Each of the white bright spots in the confocal image 221 is dyed by a reagent, and includes a portion which was excited by the confocal light and emitted fluorescence.

In step S23, the superposing unit 113 superposes the TIRF image and the confocal image. In concrete terms, the user selects the TIRF image and a desired confocal image using the operation unit (not illustrated) of the computer 15, and the operation unit notifies this information to the superposing unit 113. Using the coordinate transformation coefficients calculated by the coordinate transformation coefficient calculation unit 112, the superposing unit 113 generates an image by transforming the coordinate system of the confocal image selected by the user into the coordinate system of the TIRF image. The superposing unit 113 also generates an image by superposing the TIRF image selected by the user and the confocal image of which coordinate system was transformed. The display device 16 displays the superposed image based on the control by the computer 15. Then the superposing processing ends.

Figure 11:
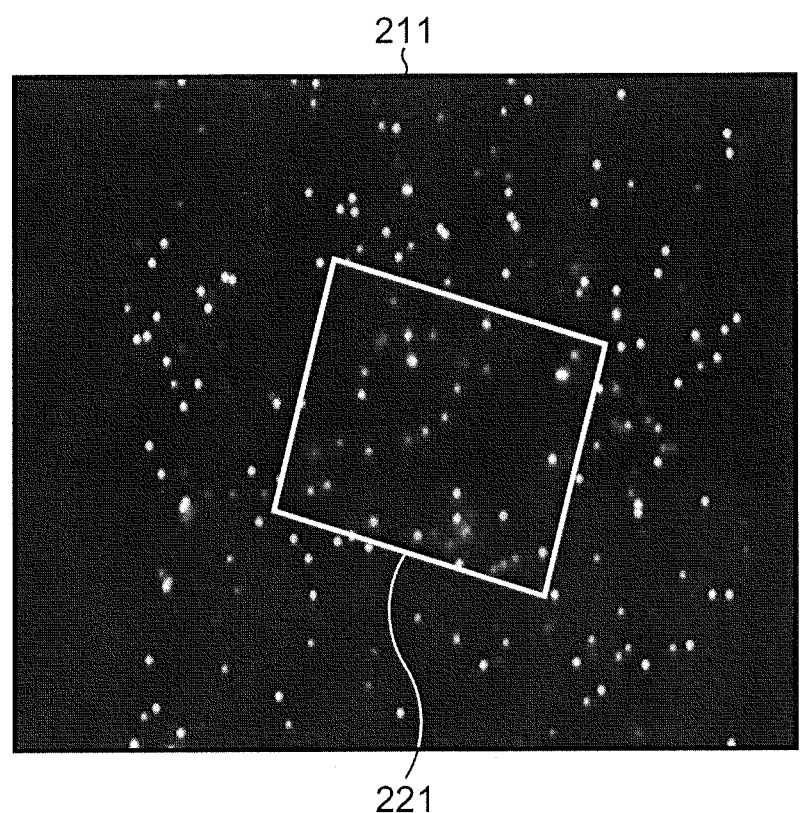
FIG. 11 shows an example of an image generated by superposing a TIRF image and a confocal image.

FIG. 11 shows an image generated by superposing the TIRF image 211 in FIG. 8 and the confocal image 221 in FIG. 10.

A number of TIRF images and a number of confocal images to be superposed are not especially limited, and, for example, one TIRF image and one confocal image may be superposed, or a three-dimensional image generated by superposing a confocal image of each cutting plane of the sample 3 in the thickness direction may be superposed on the TIRF image.

Thus a TIRF image and a confocal image can be superposed simply and accurately.

Now a second embodiment of the superposing processing to be executed by the microscope system 1 will be described with reference to a flow chart in FIG. 12. The second embodiment of the superposing processing is for superposing a TIRF image and a confocal image without using the test sample 201.

Figure 6:
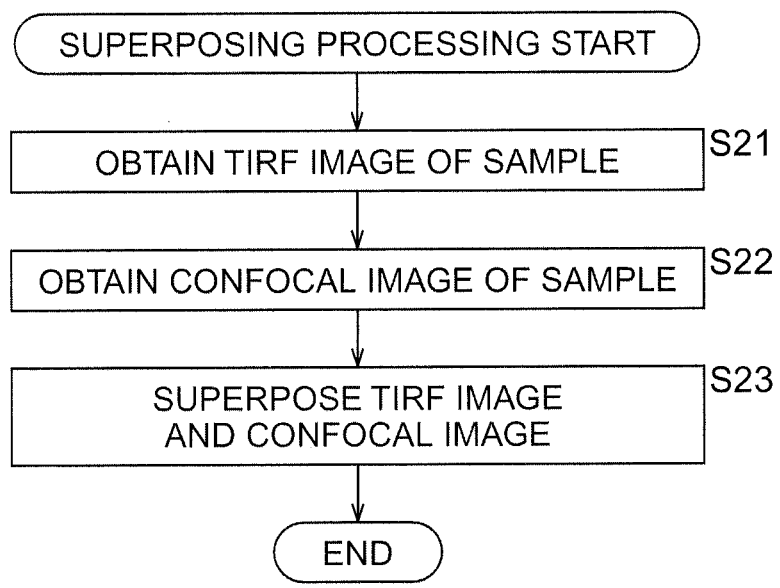
FIG. 6 is a flow chart depicting a first embodiment of superposing processing executed by the microscope system.

In step S41, a TIRF image of the sample 3 is obtained, just like the processing in step S21 in FIG. 6. The obtained TIRF image is supplied to the superposing unit 113.

Figure 13:
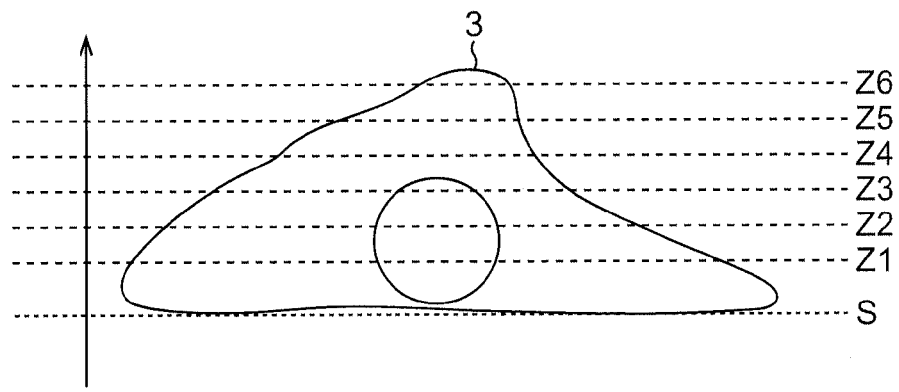
FIG. 13 is a diagram depicting a capturing position of a confocal image.

In step S42, a confocal image of the sample 3 is obtained, just like the processing in step S22 in FIG. 6. In this case, as FIG. 13 shows, not only a confocal image of each cutting plane at positions Z1 to Z6 of the sample 3, but also a confocal image on the boundary surface S between the cover glass 2 and the sample 3 is also obtained. The obtained confocal images are supplied to the superposing unit 113.

Figure 14:
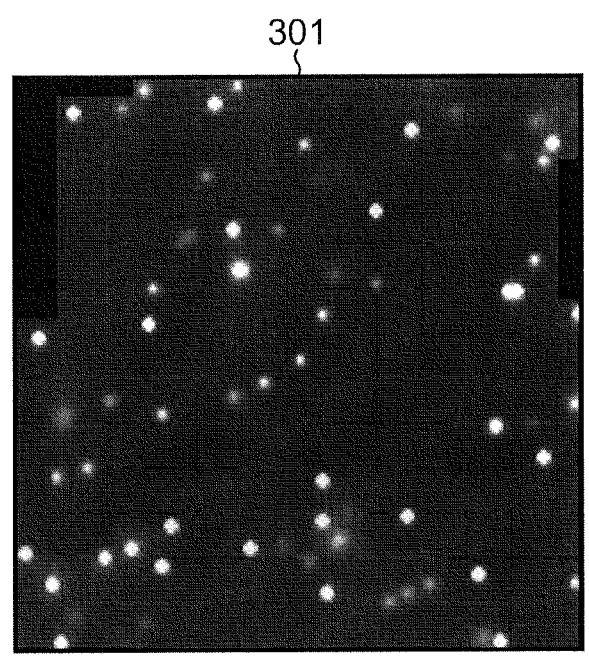
FIG. 14 shows an example of a confocal image.

The confocal image 301 in FIG. 14 shows an example of a confocal image on the boundary surface S of the sample 3.

In step S43, the superposing unit 113 determines whether calculation of coordinate transformation coefficients is necessary. If it is determined that calculation of the coordinate transformation coefficients is necessary, processing advances to step S44.

Possible conditions under which the calculation of the coordinate transformation coefficients is necessary are, for example, a case of the user instructing [the system] to calculate the coordinate transformation coefficients, or a component (e.g. objective lens 37) of the optical system of the microscope 1 is replaced or setting thereof is changed, or the coordinate transformation coefficients have not yet been calculated, or the sample 3 is changed.

In step S44, the reference point detection unit 111 extracts bright spots of the TIRF image. In concrete terms, the superposing unit 113 supplies the TIRF image and the confocal image on the boundary surface S to the reference point detection unit 111, and instructs the reference point detection unit 111 and the coordinate transformation coefficient calculation unit 112 to calculate the coordinate transformation coefficients.

The reference point detection unit 111 binarizes the TIRF image using a predetermined threshold. In other words, the reference point detection unit 111 sets, for each pixel of the TIRF image, a pixel value of a pixel of which brightness is a predetermined threshold or more to a maximum value (white), and a pixel value of a pixel of which brightness is less than the predetermined threshold to 0 (black), so as to generate a binary image. For example, the binary image 311 in FIG. 15 is generated by binarizing the TIRF image 211 in FIG. 8.

Hereafter among the pixels of the binary image, a pixel of which pixel value is set to a maximum value is referred to as a white pixel, and a pixel of which pixel value is set to 0 is referred to as a black pixel.

Then in the binary image of the TIRF image, the reference point detection unit 111 extracts an area where at least a predetermined number (e.g. 2) of white pixels are adjacent to each other in a vertical, horizontal or diagonal direction as a bright spot area. Then the reference point detection unit 111 determines coordinates of the center of gravity of each bright spot area (hereafter simply called "bright spot") in the coordinate system of the TIRF image.

Figure 15:
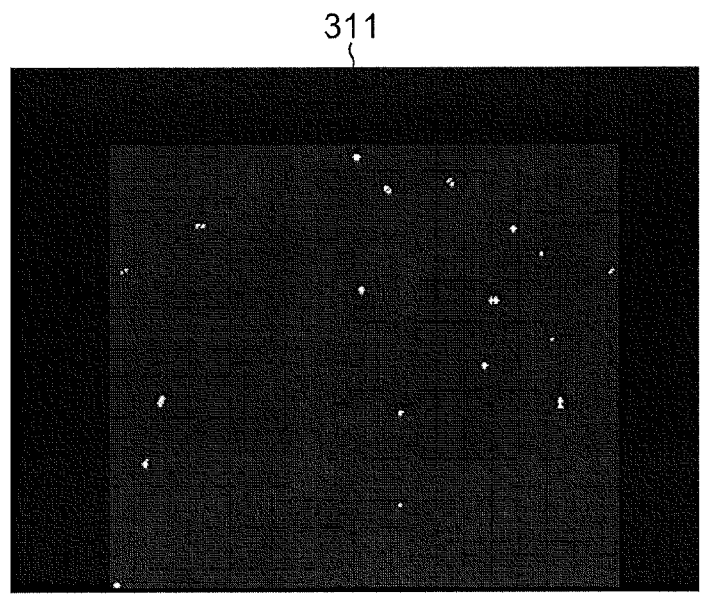
FIG. 15 shows an example of a binary image of a TIRF image.
Figure 16:
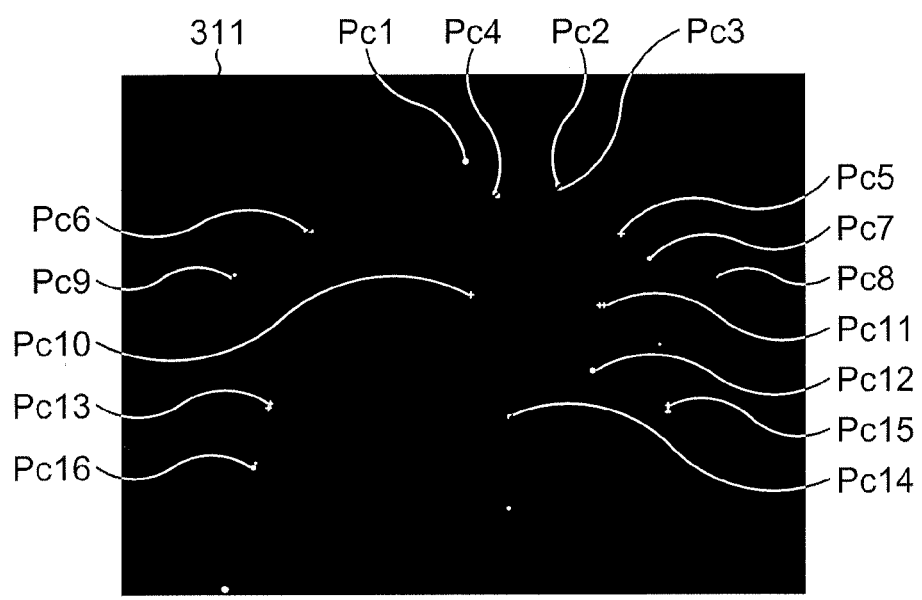
FIG. 16 shows positions of bright spots in the TIRF image.

FIG. 16 shows the positions of bright spots Pt1 to Pt16 detected from the binary image 311 in FIG. 15.

In step S45, the reference point detection unit 111 lists the combinations of three bright spots from the TIRF image. For example, in the case of the binary image 311 in FIG. 16, 560 combinations of three bright spots, that is (bright spot Pt1, bright spot Pt2, bright spot Pt3), (bright spot Pt1, bright spot Pt2, bright spot Pt4), ..., (bright spot Pt14, bright spot Pt15, bright spot Pt16) are listed.

In step S46, the reference point detection unit 111 calculates angles among the three bright spots of each combination listed from the TIRF image. For example, in the case of a combination of the bright spot Pt1, bright spot Pt2 and bright spot Pt3 in the binary image 311, the angle of each vertex of the triangle formed by the bright spot Pt1, bright spot Pt2 and bright spot Pt3 is calculated. This calculation of an angle of each vertex of the triangle is executed for all listed combinations of bright spots.

Figure 17:
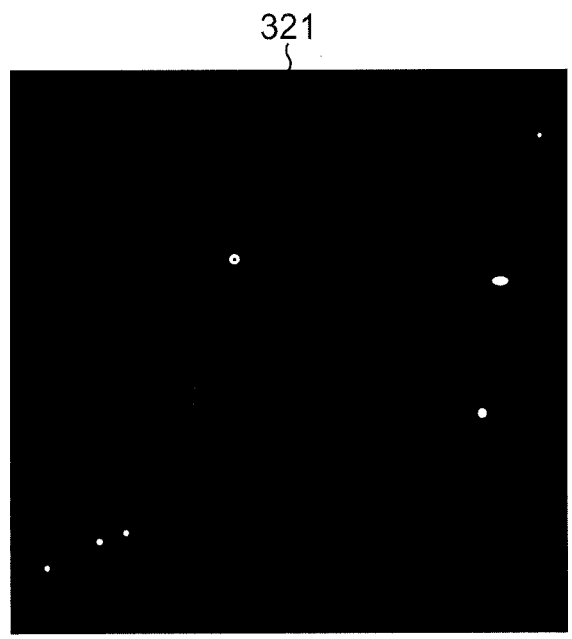
FIG. 17 shows an example of a binary image of a confocal image.
Figure 18:
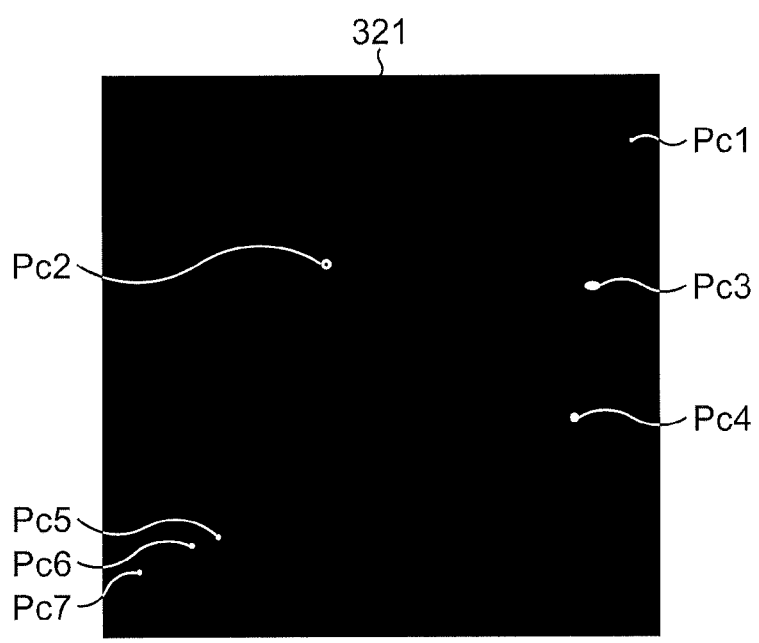
FIG. 18 shows positions of bright spots in the confocal image.

In step S47, bright spots of the confocal image are extracted by the same processing as step S44, and the coordinates of each extracted bright spot in the coordinate system of the confocal image are determined. FIG. 17 shows a binary image 321 generated by binarizing the confocal image 301 in FIG. 14. FIG. 18 shows the positions of the bright spots Pc1 to Pc7 extracted from the binary image 321.

In step S48, the combinations of three bright spots are listed from the confocal image by the same processing as step S45.

In step S49, angles among the three bright spots of each combination, listed from the confocal image, are calculated by the same processing as step S46.

Between the TIRF image and the confocal image, extracted bright spots do not always match since the irradiation range of the illumination light is different, even if these are images capturing the same boundary surface S of the sample 3. In other words, in the case of capturing the TIRF image, the TIRF light is irradiated only in a very shallow range near the boundary surface S of the sample 3, while in the case of capturing the confocal image, the confocal light is irradiated down to a position deeper than the case of the TIRF light.

Figure 19:
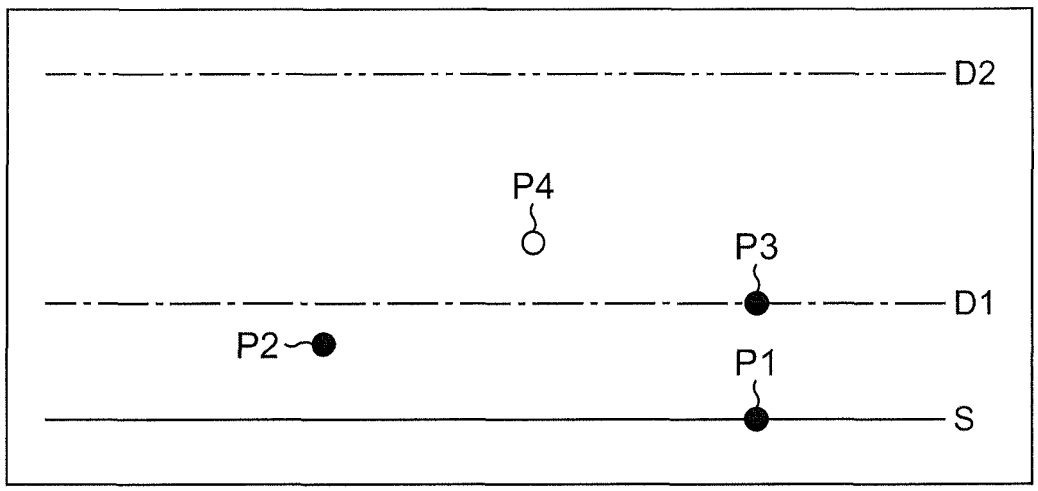
FIG. 19 is a diagram depicting the difference of positions of bright spots between a TIRF image and a confocal image.

FIG. 19 shows a vertical cross-section of the sample 3, where the points P1 to P4 are positions dyed by a reagent. For example, in the case of irradiating the TIRF light onto the boundary surface S of the sample 3, the TIRF light is irradiated down to the depth D1 from the boundary surface S, and the points P1 to P3 in the irradiation range are excited and emit fluorescence. In the case of collecting the confocal light on the boundary surface S of the sample 3, on the other hand, the confocal light which diverged down to depth D2 from the boundary surface S is irradiated, and the points P1 to P4 in the irradiation range are excited and emit fluorescence. Therefore three points, P1 to P3, are detected as bright spots in the case of the TIRF image, but the points P1 to P4 (approximately conjugate to the pin hole 39) are extracted as bright spots in the case of the confocal image, in other words, extracted bright spots do not match.

Figure 20:
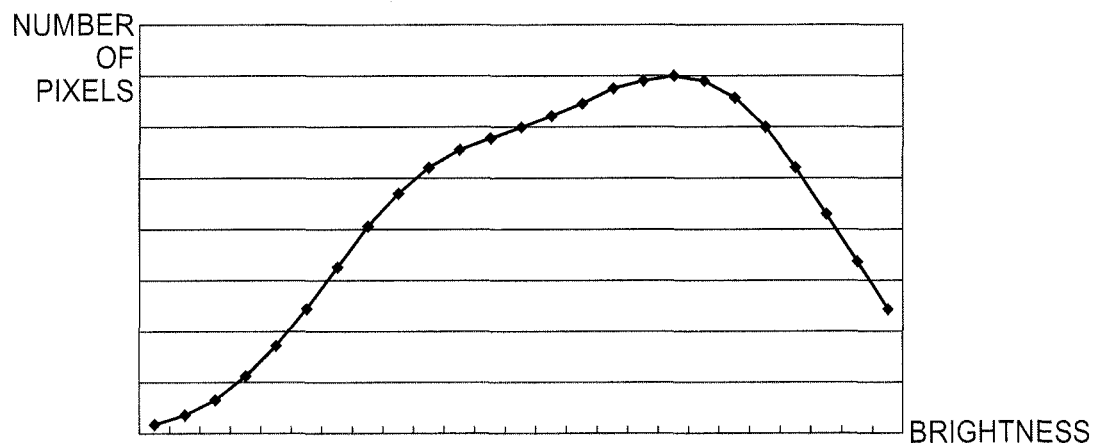
FIG. 20 is a graph showing an example of the distribution of brightness in a TIRF image.
Figure 21:
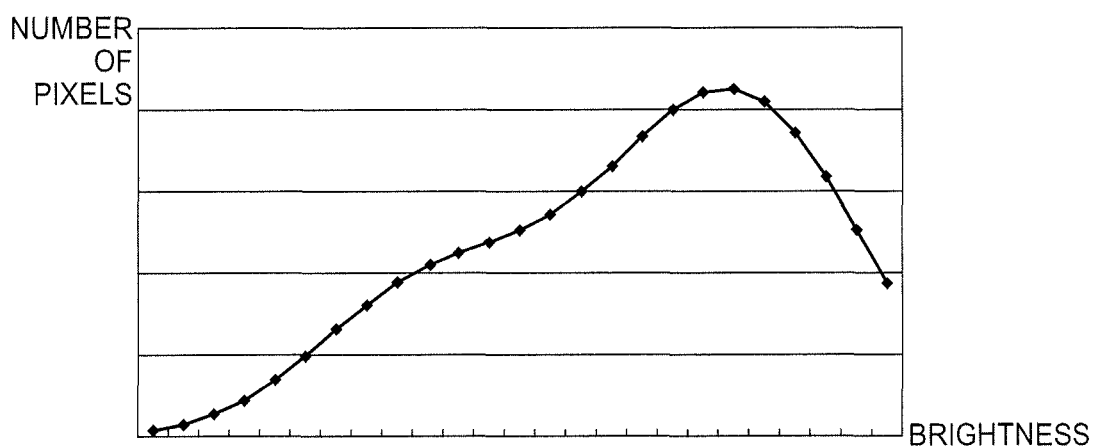
FIG. 21 is a graph showing an example of the distribution of brightness of a confocal image.

FIG. 20 shows an example of the brightness distribution of the TIRF image capturing the boundary surface S of the sample 3, and FIG. 21 shows an example of the brightness distribution of the confocal image capturing the boundary surface S of the sample 3. The abscissas of FIG. 20 and FIG. 21 indicate brightness, and the ordinates thereof indicate a number of pixels. As comparison of FIG. 20 and FIG. 21 shows, brightness distribution is different between the confocal image and the TIRF image, hence difference is generated in the bright spots to be extracted between the two images.

Then in the processing in steps S50 to S52, which will be described herein below, the bright spots extracted from the TIRF image and the bright spots extracted from the confocal image are corresponded, and reference points to be used for the coordinate transformation coefficients are determined.

In concrete terms, in step S50, the reference point detection unit 111 extracts a pair of combinations of bright spots, where the angles among three points match between the TIRF image and the confocal image. In other words, the reference point detection unit 111 compares the angles among three points for all the pairs formed by one of the combinations of three bright spots in the TIRF image and one of the combinations of three bright spots in the confocal image, and extracts the pairs of which the differences of the angles are within a predetermined range.

For example, a pair formed by a combination of bright spots A to C in the TIRF image and a combination of bright spots P to R in the confocal image is considered. In this case, if the difference of each corresponding angle of a triangle ABC, of which vertexes are the bright spots A to C, and a triangle PQR, of which vertexes are the bright spots P to R, is within a predetermined range (e.g. within three degrees), that is if the triangle ABC and the triangle PQR are approximately similar, the pair of the bright spots A to C and the bright spots P to R is extracted as a pair of combinations of bright spots of which angles among the three points match, but if the difference of the angles exceeds the predetermined range, the pair of the bright spots A to C and the bright spots P to R is not extracted as a pair of combinations of bright spots of which angles among three points match.

In step S51, the reference point detection unit 111 classifies the pairs of bright spots of which angles among the three points match, based on the ratio of the lengths among the three points. In concrete terms, for each pair of combinations of bright spots extracted in step S50, the reference point detection unit 111 calculates the ratio of the lengths among the three bright spots in one combination and the ratio of the lengths among the three bright spots in the other combination.

For example, it is assumed that a pair formed by a combination of bright spots A to C in the TIRF image and a combination of bright spots P to R in the confocal image is extracted, and in the triangle ABC of which vertexes are the bright spots A to C and the triangle PQR of which vertexes are the bright spots P to R, where angle a≅angle p, angle b≅angle q and angle c≅angle r. In this case, the triangle ABC and the triangle PQR are approximately similar, hence the length of side AB/length of side PQ≅length of side BC/length of side QR≅length of side CA/length of side RP≅ratio α, and this ratio α is determined as a ratio of the lengths among the three points.

The reference point detection unit 111 calculates the ratio α for all the extracted pairs. Then the reference point detection unit 111 classifies each pair based on the ratio α. In other words, the reference point detection unit 111 classifies the values of the ratio α into a plurality of ranges with a predetermined interval, and groups pairs, of which ratio α enters a same value range, into one group. Thereby pairs formed by combinations of bright spots, having a similar ratio of the sides of the triangle of which vertexes are the three bright spots, are grouped into one group.

In step S52, the reference point detection unit 111 sets bright spots belonging to a group having the highest number of pairs as the reference points. In other words, out of the groups, each of which includes pairs formed by combinations of bright spots and classified based on the ratio α, the reference point detection unit 111 sets brightness spots belonging to a group having the highest number of pairs as the reference points.

For example, if a pair of combinations of bright spots is classified into Group 1 or Group 2, and a pair formed by the bright spots A, B and C in the TIRF image and the bright spots P, Q and R in the confocal image belongs to Group 1, a pair formed by the bright spots A, B and D in the TIRF image and the bright spots P, Q and S in the confocal image, and a pair formed by the bright spots B, D and F in the TIRF image and the bright spots Q, S and T in the confocal image belong to Group 2, then the bright spots A, B, D and F in the TIRF image and the bright spots P, Q, S and T in the confocal image, which belong to Group 2 having the highest number of pairs, are set as the reference points.

By the processing in steps S50 to S52, bright spots corresponding to a same position of the sample 3 are detected as reference points in the TIRF image and the confocal image, and detecting the bright spots existing only in one of the TIRF image and the confocal image as reference points can be prevented.

Figure 4:
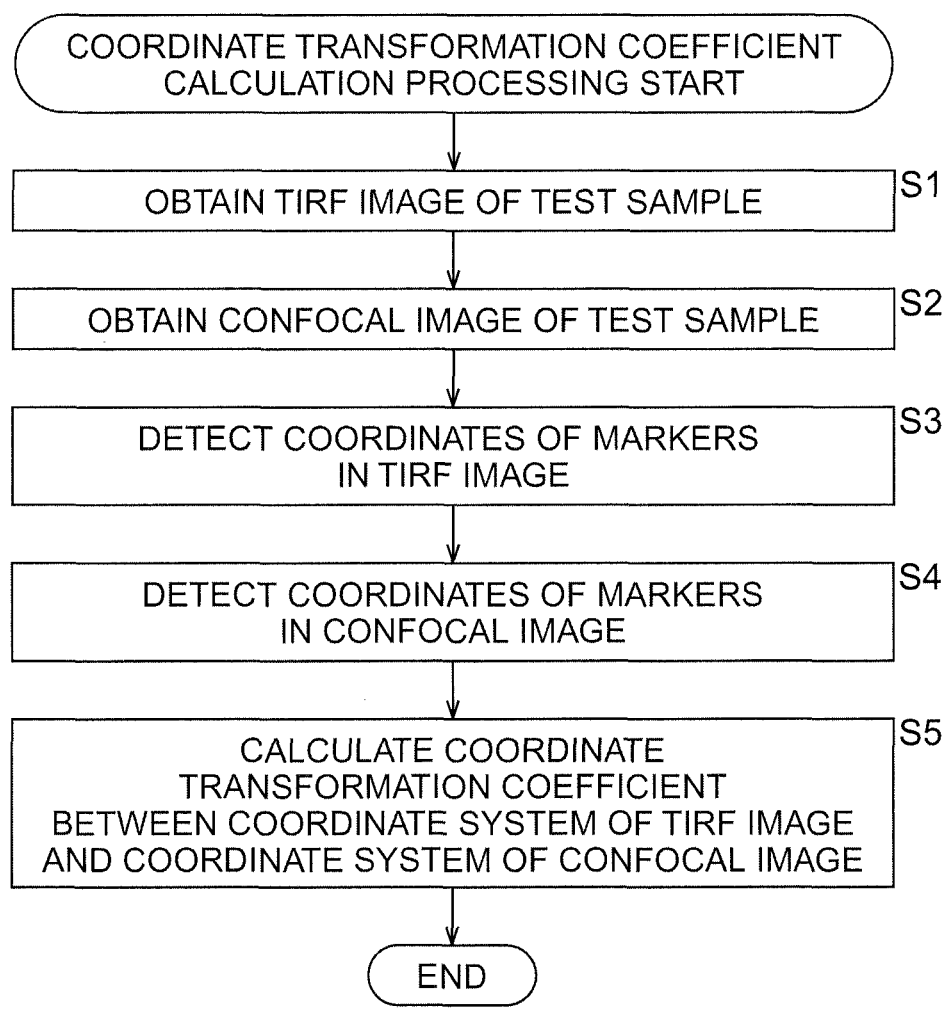
FIG. 4 is a flow chart depicting a coordinate transformation coefficient calculation processing executed by the microscope system.

In step S53, just like step S5 in FIG. 4, coordinate transformation coefficients between the coordinate system of the TIRF image and the coordinate system of the confocal image are calculated based on the reference points which were set. Then the processing advances to step S54.

If it is determined that calculation of the coordinate transformation coefficients is unnecessary in step S43, on the other hand, the processing in steps S44 to S53 is skipped, and the processing advances to step S54.

In step S54, just like the processing in step S23 in FIG. 6, the TIRF image and the confocal image are superposed and displayed on the display device 16.

In this way, coordinate transformation coefficients can be calculated based on the images capturing the actual sample 3, without using the test sample 201, and the TIRF image and the confocal image can be superposed. Therefore the troublesome step of replacing samples is sidestepped, and the TIRF image and the confocal image can be superposed more simply.

Figure 12:
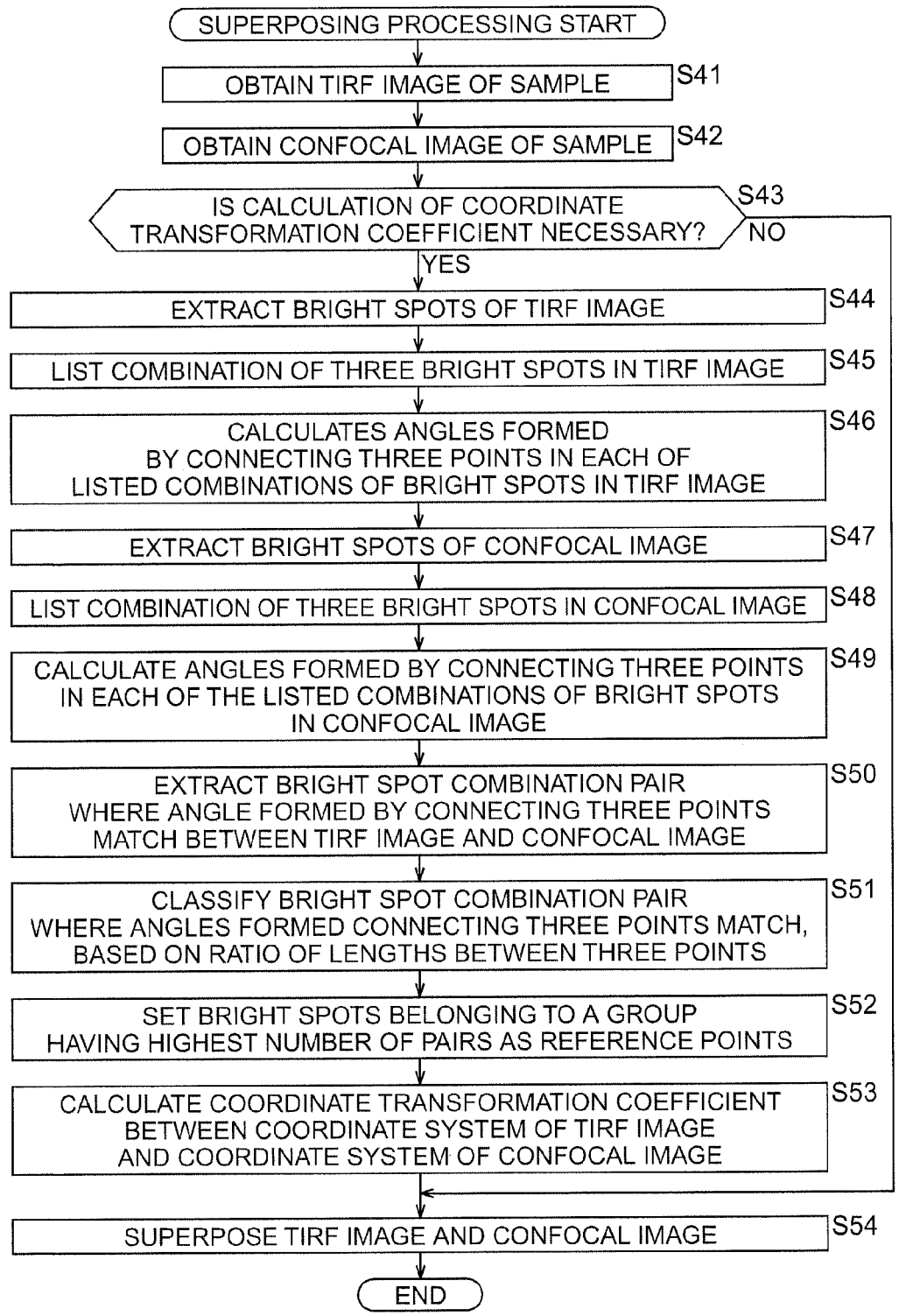
FIG. 12 is a flow chart depicting a second embodiment of superposing processing executed by the microscope system.

In the flow chart in FIG. 12, the coordinate transformation coefficients may be calculated each time without executing the determination processing in step S43. If four or more reference points are detected from each image in the processing in step S50 to S52, the coordinate transformation coefficients may be calculated using only three points thereof respectively.

In the above description, a processing of superposing the TIRF image and the confocal image captured by the same microscope 11 was described, but the present invention can also be applied to a case of superposing the TIRF image and confocal image capturing a same sample using different microscopes.

In the above description, an example of transforming the coordinate system of the confocal image into the coordinate system of the TIRF image, so as to superpose both images, was shown, but the coordinate system of the TIRF image may be transformed into the coordinate system of the confocal image so as to superpose both images. Or the coordinate system of the TIRF image and the coordinate system of the confocal image may be transformed into a third coordinate system which is different from the above mentioned two coordinate systems so as to superpose both images.

In the above description, the superposing processing of the confocal image and the TIRF image was described, but a confocal image and one of a fluorescent observation image (obtained by a regular optical microscope) a super resolution image (obtained by a super resolution microscope), and a phase contrast observation image (obtained by a phase contrast microscope), may be superposed. A TIRF image and one of a fluorescent observation image, a super resolution image and a phase contrast observation image may be superposed.

The functions of the image processing unit 101 need not always be installed on the computer 15, but may be installed on the microscope 11, for example.

The above mentioned series of processings may be executed by hardware or by software. To execute the series of processings by software, programs constituting the software are installed on the computer 15. Here the computer 15 includes a computer enclosed in dedicated hardware, and a standard personal computer which can execute various functions by installing various programs.

The programs executed by the computer 15 can be provided by being recorded on a removable media, such as a package media for example. A program can be provided by cable or radio transmission media, such as a local area network, Internet and digital satellite broadcasting. A program can also be installed in the memory of a computer 15 in advance.

The program executed by the computer 15 may be a program in which processings are executed in time series according to the sequence described in this description, or may be a program in which processings are executed in parallel, or at a required timing when called up, for example.

The term "system" in the present description refers to an entire apparatus constituted by a plurality of devices and means.

Embodiments of the present invention are not limited to the above described embodiments, but numerous modifications and variations can be made without departing from the spirit and scope of the present invention.

EXPLANATION OF REFERENCE NUMERALS 1 microscope system
2 cover glass
3 sample
11 microscope
12 image generation circuit
13 imaging device
14 image generation circuit
15 computer
16 display device
101 image processing unit
111 reference point detection unit
112 coordinate transformation coefficient calculation unit
113 superposing unit

The invention claimed is:

1. An image processor comprising:
a reference point detection unit that extracts a first plurality of bright spots in a first fluorescent image of a predetermined surface of a sample which is obtained using a first microscope, extracts a second plurality of bright spots in a second fluorescent image of the predetermined surface of the sample, which is obtained using a second microscope, and extracts at least three corresponded bright spots as first and second groups of reference points from each of the first and second pluralities of bright spots, respectively, based on angles formed among the first plurality of bright spots in the first fluorescent image and angles formed among the second plurality of bright spots in the second fluorescent image; and
a calculation unit that calculates transformation coefficients for matching the at least three corresponded bright spots of the first group of reference points in the first fluorescent image and the at least three corresponded bright spots of the second group of reference points in the second fluorescent image.

2. The image processor according to claim 1, wherein
the reference point detection unit extracts the first and second pluralities of bright spots using a first binary image generated by binarizing the first fluorescent image using a first predetermined threshold and a second binary image generated by binarizing the second fluorescent image using a second predetermined threshold.

3. The image processor according to claim 1, wherein
the calculation unit calculates the transformation coefficients which are used for mutually transforming a first coordinate system and a second coordinate system by Helmert transformation.

4. The image processor according to claim 1, wherein
the first microscope is a total internal reflection fluorescent microscope and the second microscope is a confocal microscope, and
the predetermined surface is a surface for totally reflecting illumination light in the total internal reflection fluorescence microscope at an interface of the sample and a cover glass.

5. The image processor according to claim 4, further comprising a superposing unit that superposes, using the transformation coefficients, the first fluorescent image and an image, obtained using the confocal microscope, of a surface of the sample, which is at a different position in a thickness direction from the predetermined surface.

6. The image processor according to claim 1, further comprising a superposing unit that superposes the first fluorescent image and the second fluorescent image using the transformation coefficients.

7. The image processor according to claim 1, wherein
the calculation unit calculates the transformation coefficients which are used for transforming a first coordinate system and a second coordinate system into a third coordinate system which is different from the first and second coordinate systems.

8. The image processor according to claim 1, further comprising a superposing unit that superposes, using the transformation coefficients, the first fluorescent image obtained using the first microscope and the second fluorescent image obtained using the second microscope.

9. The image processor according to claim 1, wherein the sample is dyed by a reagent.

10. The image processor according to claim 1, wherein the sample is an object to be observed.

11. The image processor according to claim 1, wherein the reference point detection unit extracts the at least three corresponded bright spots in the first and second fluorescent images based on ratios of imaginary lines among the at least three corresponded bright spots in the first and second fluorescent images.

12. The image processor according to claim 11, wherein the reference point detection unit extracts the at least three corresponded bright spots in the first and second fluorescent images based on polygons formed by the imaginary lines among the at least three corresponded bright spots in the first and second fluorescent images.

13. An image processing method comprising:
  judging whether a first plurality of bright spots in a first fluorescent image of a predetermined surface of a sample, which is obtained using a first microscope, and a second plurality of bright spots in a second fluorescent image of the predetermined surface of the sample, which is obtained using a second microscope, correspond to bright spots at identical positions on the predetermined surface of the sample by
    extracting at least three corresponded bright spots as first and second groups of reference points from each of the first and second pluralities of bright spots, respectively, based on angles formed among the first plurality of bright spots in the first fluorescent image and angles formed among the second plurality of bright spots in the second fluorescent image; and
    calculating transformation coefficients for matching a first coordinate system of the at least three corresponded bright spots of the first group of reference points in the first fluorescent image and a second coordinate system of the at least three corresponded bright spots of the second group of reference points in the second fluorescent image.

14. A non-transitory computer readable medium storing thereon a program that when executed by a computer causes a computer to execute processing comprising:
  judging whether a first plurality of bright spots in a first fluorescent image of a predetermined surface of a sample, which is obtained using a first microscope, and a second plurality of bright spots in a second fluorescent image of the predetermined surface of the sample, which is obtained using a second microscope, correspond to bright spots at identical positions on the predetermined surface of the sample by
    extracting at least three corresponded bright spots as first and second groups of reference points from each of the first and second pluralities of bright spots, respectively, based on angles formed among the first plurality of bright spots in the first fluorescent image and angles formed among the second plurality of bright spots in the second fluorescent image; and
    calculating transformation coefficients for matching a first coordinate system of the at least three corresponded bright spots of the first group of reference points in the first fluorescent image and a second coordinate system of the at least three corresponded bright spots of the second group of reference points in the second fluorescent image.

15. A microscope which can be used as a first microscope and as a second microscope, comprising:
  a reference point detection unit that extracts a first plurality of bright spots in a first fluorescent image of a predetermined surface of a sample, which is obtained using the microscope as the first microscope, and a second plurality of bright spots in a second fluorescent image of the predetermined surface of the sample, which is obtained using the microscope as the second microscope, and extracts at least three corresponded bright spots as first and second groups of reference points from each of the first and second pluralities of bright spots, respectively, based on angles formed among the first plurality of bright spots in the first fluorescent image and the second plurality of bright spots in the second fluorescent image; and
  a calculation unit that calculates transformation coefficients for matching at least three corresponded bright spots of the first group of reference points in the first fluorescent image and the at least three corresponded bright spots of the second group of reference points in the second fluorescent image.

* * * * *

UNITED STATES PATENT AND TRADEMARK OFFICE
CERTIFICATE OF CORRECTION

| | |
|---|---|
| PATENT NO. | : 9,030,546 B2 |
| APPLICATION NO. | : 13/310178 |
| DATED | : May 12, 2015 |
| INVENTOR(S) | : Takaaki Okamoto |

It is certified that error appears in the above-identified patent and that said Letters Patent is hereby corrected as shown below:

In the Specification

Column 1, Cross-Reference to Related Applications, Line 8, Delete "PCT/PCT/" and insert -- PCT/ --, therefor.
Column 1, Cross-Reference to Related Applications, Line 10, Delete "Jun. 2, 2008," and insert -- Jun. 2, 2009, --, therefor.

In the Claims

Column 18, Line 38, In Claim 15, after "matching" insert -- the --.

Signed and Sealed this
Eighteenth Day of August, 2015

Michelle K. Lee
*Director of the United States Patent and Trademark Office*